Jan. 17, 1928.
G. SAMUELL ET AL
1,656,340
TIRE TOOL
Filed May 26, 1927
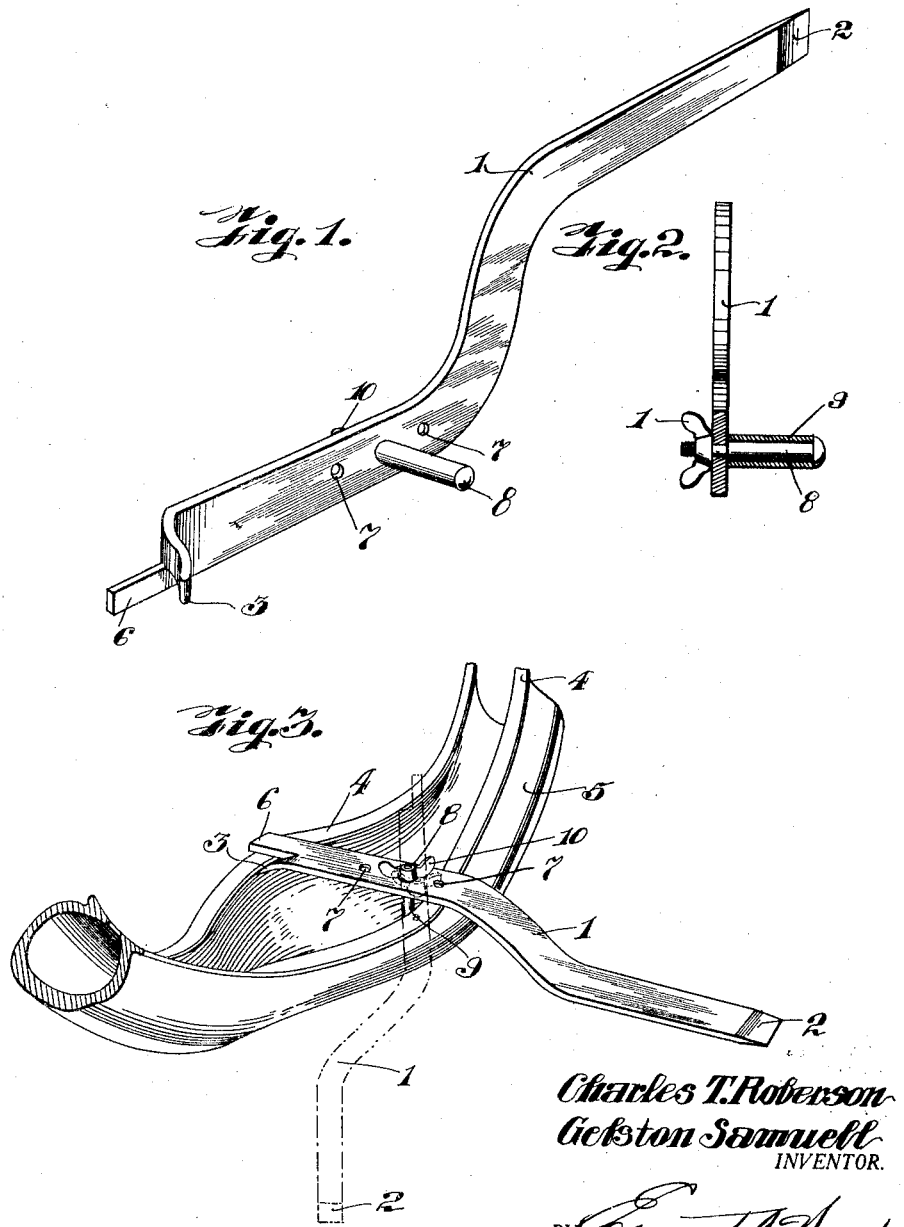
Charles T. Roberson
Gelston Samuell
INVENTOR.
BY Ernest A. Hord
ATTORNEY.

Patented Jan. 17, 1928.

1,656,340

UNITED STATES PATENT OFFICE.

GELSTON SAMUELL AND CHARLES T. ROBERSON, OF DALLAS, TEXAS.

TIRE TOOL.

Application filed May 26, 1927. Serial No. 194,463.

This invention relates to automobile and mechanics tools and equipment, and it refers more particularly to an improved tool possessing the combined features of a tire tool, jack handle and tire casing spreader, and its principal object resides in the provision of a tool of simple and economical construction which may be conveniently carried in the tool kit or used by the mechanic to minimize the effort required in repairing casings, and for other purposes.

Another object of the invention resides in the provision of such a tool as specified wherein means are provided by which it may be adjusted for any size of casing to spread the side walls thereof to permit of examination of the interior of its tread.

Yet another object resides in the particular form and shape of the invention, its apparent simplicity of operation and construction.

With these foremost objects and advantages in view, the invention has particular reference to its salient features of construction which will become manifest as the description proceeds, taken in connection with the accompanying drawings, wherein:

Figure 1 represents a perspective view of a tool constructed according to the present invention.

Figure 2 is a lateral sectional view thereof, and

Figure 3 is a perspective view showing a fragmentary illustration of a tire casing exemplifying the manner of operating the invention in spreading the same.

Continuing now more in detail with the invention, it may be stated that in repairing tires, it is necessary first to determine the condition of the walls of the casing, especially the interior of the tread before insertion of the inner tube, in order to ascertain whether or not any abrasions or breaks are present therein which may injure the tube. This is usually done by hand without the aid of tools, and especially in repairing large tires, this practice is difficult consequently the invention proposes to provide a means by which the walls of the casing may be more readily and easily spread apart to examine the interior thereof.

In Figure 1 is shown an embodiment of the invention comprising a handle member 1 of substantially S shape, one end of which is formed into a chisel edge at 2, which provides a tool by which the casing may be removed from and placed upon the rim, not shown, but in most cases a simple tool formed of a metal strip serves this latter purpose. The opposite end of the member 1 is bifurcated as shown, and a portion 3 thereof is bent to conform with the head 4 of the casing 5, as apparent in Figure 3, while the companion portion 6 engages over the bead, permitting a firm grasp to be had by the tool on the casing.

A series of apertures 7 are made in the handle member 1 at the approximate center, and in one of such apertures is inserted a pin 8, about which is placed a bushing 9, capable of unrestricted rotation. A wing nut 10 holds the pin 8 securely in position, and enables the same to be removed and placed in any one of the several apertures 7 to accommodate casings of different sizes.

In operation, to spread the walls of a casing to examine its interior, reference is made to Figure 3. The bifurcated end of the handle member 1 is placed as shown on one side of the casing wall, whereby the curved portion 3 will conform with the inner side of the head 4, permitting the flat portion 7 to be flush with the head. The tool is applied at the angle shown in broken lines in Figure 3 in order that the bushing 9 surrounding the pin 8 will engage the inner edge of the head 4 opposing the position of the bifurcated end of the tool. Upon urging the handle 1 to the position shown in solid lines in Figure 4 or at right angles to the casing 5, the bushing 9 will roll along the head, causing the side walls of the casing to be spread apart in the manner illustrated, revealing any irregularities on the inner surface of the tread. This operation may be carried out with speed and with little effort completely around the casing.

The utility of the tool is likewise apparent in its adaptability as a jack handle, and tire tool, and in other capacities where such a tool may be required.

Manifestly, the construction shown is capable of some variation and such variation as is in keeping with the appended claims is also considered within the spirit of the invention.

What is claimed is:

1. A tire spreading tool including a substantially S shaped handle, one end of which is divided into two parts, one of which parts is bent outward and curved to conform with the inner edge of the bead of said tire; a pin disposed in one of a series of apertures in said handle at spaced distances from the operative end thereof; a bushing surrounding said pin to permit the latter to rotatably engage the opposing bead of said tire, and means to hold said pin firmly in position.

2. A tire tool comprising a substantially S shaped handle member having a bifurcated end, one of the forks thereof being so bent as to engage conformably the inner edge of the bead of said tire; a pin arranged within one of a series of apertures near the operative end of said tool; a bushing rotatably surrounding said pin and so arranged to engage non-frictionally the opposing bead of said tire when operatively applied.

3. A tire casing tool comprising a substantially S shaped handle member having a bifurcated end; one of the forks thereof being bent with respect to the companion fork so as to be conformably received by the inner edge of the bead of said casing; means spaced from said bifurcated end and arranged to rotate against the opposing bead of said casing to cause the said beads to move apart when said tool is operatively applied.

In testimony whereof we affix our signatures.

CHARLES T. ROBERSON.
GELSTON SAMUELL.